(12) United States Patent
Niu et al.

(10) Patent No.: US 11,091,389 B2
(45) Date of Patent: Aug. 17, 2021

(54) METHODS FOR MAKING COATED GLASS ARTICLES SUCH AS COATED GLASS CONTAINERS

(71) Applicant: CORNING INCORPORATED, Corning, NY (US)

(72) Inventors: Weijun Niu, Painted Post, NY (US); Wei Sun, Painted Post, NY (US); Frederic Christian Wagner, Lindley, NY (US)

(73) Assignee: Corning Incorporated, Corning, NY (US)

( * ) Notice: Subject to any disclaimer, the term of this patent is extended or adjusted under 35 U.S.C. 154(b) by 14 days.

(21) Appl. No.: 16/540,382

(22) Filed: Aug. 14, 2019

(65) Prior Publication Data
US 2020/0071228 A1  Mar. 5, 2020

Related U.S. Application Data

(60) Provisional application No. 62/725,500, filed on Aug. 31, 2018.

(51) Int. Cl.
| | | |
|---|---|---|
| C03C 17/32 | (2006.01) | |
| C03C 17/00 | (2006.01) | |
| C03C 17/25 | (2006.01) | |

(52) U.S. Cl.
CPC ............ *C03C 17/32* (2013.01); *C03C 17/003* (2013.01); *C03C 17/009* (2013.01); *C03C 17/256* (2013.01)

(58) Field of Classification Search
None
See application file for complete search history.

(56) References Cited

U.S. PATENT DOCUMENTS

| | | | |
|---|---|---|---|
| 3,853,674 A | 12/1974 | Levene | |
| 4,289,816 A * | 9/1981 | Fogelberg | ............... C03C 17/23 427/226 |

(Continued)

FOREIGN PATENT DOCUMENTS

| | | | |
|---|---|---|---|
| CN | 106383391 A | 2/2017 | |
| WO | 2017178584 A1 | 10/2017 | |
| WO | WO-2017178584 A1 * | 10/2017 | ........... C09D 183/08 |

OTHER PUBLICATIONS

International Search Report and Written Opinion of the European International Searching Authority; PCT/US2019/047437; dated Nov. 5, 2019; 10 Pgs.

(Continued)

*Primary Examiner* — Cachet I Proctor
(74) *Attorney, Agent, or Firm* — Michael G. Panian (57) ABSTRACT

According to one or more embodiments disclosed herein, a coated glass article may be made by a method that includes applying a water-based coating mixture onto at least a portion of a first surface of a glass article, and heating the water-based coating mixture to form a coating on the first surface of the glass article, where the coating includes metal oxide and polymer. The water-based coating mixture may include comprise water in an amount of at least 50% by weight of the water-based coating mixture, a polymer or polymer precursor, and a metal oxide precursor. The polymer or polymer precursor may be miscible in the water or may form an emulsion with the water. The metal oxide precursor may be miscible in the water or may form an emulsion with the water.

20 Claims, 3 Drawing Sheets

(56) References Cited

U.S. PATENT DOCUMENTS

| | | | |
|---|---|---|---|
| 6,589,457 B1* | 7/2003 | Li | C23C 18/1216 |
| | | | 216/56 |
| 7,201,965 B2 | 4/2007 | Gulati et al. | |
| 8,538,885 B2 | 9/2013 | Faith et al. | |
| 9,668,936 B2 | 6/2017 | Fadeev et al. | |
| 9,744,099 B2 | 8/2017 | Fadeev et al. | |
| 9,763,852 B2 | 9/2017 | Fadeev et al. | |
| 9,775,775 B2 | 10/2017 | Fadeev et al. | |
| 10,413,483 B2* | 9/2019 | Weeks | C03C 3/087 |
| 2004/0186216 A1 | 9/2004 | Satoh et al. | |
| 2013/0171456 A1* | 7/2013 | Fadeev | C03C 21/002 |
| | | | 428/429 |
| 2013/0224407 A1 | 8/2013 | Fadeev et al. | |
| 2014/0034544 A1* | 2/2014 | Chang | C03C 17/42 |
| | | | 206/524.3 |
| 2014/0151370 A1* | 6/2014 | Chang | B65D 23/0835 |
| | | | 220/62.15 |
| 2017/0087058 A1 | 3/2017 | Fadeev et al. | |
| 2017/0121058 A1* | 5/2017 | Henry | C03C 17/005 |
| 2019/0202732 A1* | 7/2019 | Wagner | B65D 23/02 |

OTHER PUBLICATIONS

De Riccardis et al; "Study of Polymer Particles Suspensions for Electrophoretic Deposition"; J. Phys. Chem. B.; 117; (2013) pp. 1592-1599.

De Rosa et al; "Scratch Resistant Polyimide Coatings for Aluminosilicate Glass Surface"; The Journal of Adhesion, 78:2; (2010); pp. 113-127.

Ershad-Langroudi et al; "Hydrophobic Hybrid Inorganic-Organic Thin Film Prepared by Sol-Gel Process for Glass Protection and Strengthening Applications"; Applied Polymer Science; vol. 65, Issue 12 (1997) pp. 2387-2393.

Fabbri et al; "Surface Properties of Fluorinated Hybrid Coatings"; Applied Polymer Science; vol. 102; (2006) pp. 1483-1488.

Fabes et al; "Strengthening of Glass by Sol-Gel Coatings"; J. Am. Ceram. Soc. 74 [4] (1990) pp. 978-988.

Holubova et al; "Weatherability of Hybrid Organic-Inorganic Silica Protective Coatings on Glass"; Progress in Organic Coatings; 88 (2015) 172-180.

Kirtay et al; "Glass Strengthening by $SiO_2$—$TiO_2$ Organically Modified Silica Coating"; Thin Solid Films 515 (2006) pp. 2145-2152.

Li et al; "Synthesis of Polymeric Fluorinated Sol-Gel Precursor for Fabrication of Syperhydrophobic Coating"; Applied Surface Science; 367 (2016) pp. 101-108.

Quinn, "NIST Recommended Practice Guide: Fractography of Ceramics and Glasses," NIST Special Publication 960-17 (2006); 537 Pages.

Wu et al; "Non-Stick and Scratch Resistant Sol-Gel Coating for Aluminum"; Mat. Res. Soc. Symp. Proc. 2011 vol. 778; 6 Pages.

Wu; "Predicting Chain Conformation and Entanglement of Polymers From Chemical Structure"; Polymer Engineering and Science; vol. 32, No. 12 (1992) pp. 823-830.

* cited by examiner

METHODS FOR MAKING COATED GLASS ARTICLES SUCH AS COATED GLASS CONTAINERS

CROSS-REFERENCE TO RELATED APPLICATION

This application claims the benefit of priority under 35 U.S.C § 120 of U.S. Provisional Application Ser. No. 62/725,500 filed on Aug. 31, 2018, the content of which is relied upon and incorporated herein by reference in its entirety.

BACKGROUND

Field

One or more embodiments of the present specification generally relates to glass articles and, more specifically, to methods for applying coatings to glass surfaces.

Technical Background

Historically, glass has been used as the preferred material for packaging pharmaceuticals because of its hermeticity, optical clarity, and excellent chemical durability relative to other materials. Specifically, the glass used in pharmaceutical packaging must have adequate chemical durability so as not to affect the stability of the pharmaceutical compositions contained therein. Glasses having suitable chemical durability include those glass compositions within the ASTM standard 'Type 1B' which have a proven history of chemical durability.

However, use of glass for such applications is limited by the mechanical performance of the glass. In the pharmaceutical industry, glass breakage is a safety concern for the end user, as the broken package and/or the contents of the package may injure the end user. Further, non-catastrophic breakage (i.e., when the glass cracks but does not break) may cause the contents to lose their sterility which, in turn, may result in costly product recalls.

Specifically, the high processing speeds utilized in the manufacture and filling of glass pharmaceutical packages may result in mechanical damage on the surface of the package, such as abrasions, as the packages come into contact with processing equipment, handling equipment, and/or other packages. This mechanical damage significantly decreases the strength of the glass pharmaceutical package resulting in an increased likelihood that cracks will develop in the glass, potentially compromising the sterility of the pharmaceutical contained in the package or causing the complete failure of the package.

One approach to improving the mechanical durability of the glass package is to thermally and/or chemically temper the glass package. Thermal tempering strengthens glass by inducing a surface compressive stress during rapid cooling after forming. This technique works well for glass articles with flat geometries (such as windows), glass articles with thicknesses greater than about 2 mm, and glass compositions with high thermal expansion. However, pharmaceutical glass packages typically have complex geometries (vial, tubular, ampoule, etc.), thin walls (sometimes between about 1-1.5 mm), and are produced from low expansion glasses, making glass pharmaceutical packages unsuitable for strengthening by conventional thermal tempering. Chemical tempering also strengthens glass by the introduction of surface compressive stress. The stress is introduced by submerging the article in a molten salt bath. As ions from the glass are replaced by larger ions from the molten salt, a compressive stress is induced in the surface of the glass. The advantage of chemical tempering is that it can be used on complex geometries, thin samples, and is relatively insensitive to the thermal expansion characteristics of the glass substrate.

However, while the aforementioned tempering techniques improve the ability of the strengthened glass to withstand blunt impacts, these techniques are less effective in improving the resistance of the glass to abrasions, such as scratches, which may occur during manufacturing, shipping and handling.

Accordingly, a need exists for alternative glass articles which have improved resistance to mechanical damage.

SUMMARY

Described herein are coatings for glass articles, such as glass containers. According to one embodiment, a coated glass article may be made by a method that includes applying a water-based coating mixture onto at least a portion of a first surface of a glass article, and heating the water-based coating mixture to form a coating on the first surface of the glass article, wherein the coating comprises metal oxide and polymer. The water-based coating mixture may comprise water in an amount of at least 50% by weight of the water-based coating mixture, a polymer or polymer precursor, and a metal oxide precursor. The polymer or polymer precursor may be miscible in the water or may form an emulsion with the water. The metal oxide precursor may be miscible in the water or may form an emulsion with the water.

According to another embodiment, a coated glass container may be made by a method that includes applying a water-based coating mixture onto at least a portion of a first surface of a glass container, and heating the water-based coating mixture to form a coating on the first surface of the glass container, wherein the coating comprises metal oxide and polymer. The water-based coating mixture may comprise water in an amount of at least 50% by weight of the water-based coating mixture, a polymer or polymer precursor, and a metal oxide precursor. The polymer or polymer precursor may be miscible in the water or may form an emulsion with the water. The metal oxide precursor may be miscible in the water or may form an emulsion with the water.

Additional features and advantages of the coatings that may be used for coating glass articles, coated glass articles, and methods and processes for manufacturing the same will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Reference will now be made in detail to various embodiments of coatings, glass articles with coatings, and methods for producing the same, examples of which are schematically depicted in the figures. The coating and coated articles described herein may be made by a process which utilizes a water-based coating mixture. The water-based coating mixture may be applied to a glass substrate, such as the outer surface of a glass container such as a pharmaceutical package, and then the water-based coating mixture may be heated. The heating step may form a solid coating on the glass substrate by driving off the water of the water-based coating mixture and reacting one or more constituents of the water-based coating mixture (sometimes referred to herein as "curing"). For example, the water-based coating mixture may include a polymer or polymer precursor, and an organotitanate which may be utilized as an adhesion promoter. Each of the polymer or polymer precursor and the organotitanate may be miscible or form an emulsion in the water-based coating mixture. By utilizing water, rather than an organic solvent as is the case in some conventional coatings, several advantages may be present. For example, the water-based coating mixture may be more "environmentally friendly" as such organic solvents, especially in large quantities needed for large scale manufacture, may be difficult to dispose and/or may cause harmful conditions for workers in manufacturing facilities. Additionally, the use of a water-based coating mixture may be improved over organic solvent-based coating mixtures because environmental moisture is not an issue. For example, humidity in the environment may affect conventional organic solvent-based coating systems. As such, described herein are methods for making coated glass articles, such as coated glass containers, which utilize water-based coatings which may have one or more advantages over coating systems utilizing a relatively high amount of organic solvent.

Such coated glass articles may be glass containers suitable for use in various packaging applications including, without limitation, pharmaceutical packages. It should be understood that coated glass articles may refer to coated pharmaceutical packages as described in this disclosure. In one or more embodiment, the coatings and/or the coated pharmaceutical packages are thermally stable when, after initial coating application and curing, they are exposed to non-ambient temperatures (sometimes referred to as a thermal treatment or heat treatment) such as those utilized during a depyrogenation process or lyophilization, as is set forth hereinafter is the present disclosure. For example, the coated glass articles described herein may sufficiently retain their low coefficient of friction following a thermal treatment and may not substantially yellow in color following such a thermal treatment. These pharmaceutical packages may or may not contain a pharmaceutical composition.

Various embodiments of the coatings, glass articles with coatings, and methods for forming the same will be described in further detail herein with specific reference to the appended drawings. While embodiments of the coatings described herein are applied to the outer surface of a glass container, it should be understood that the coatings described may be used as a coating on a wide variety of materials, including non-glass materials and on substrates other than containers including, without limitation, glass display panels and the like.

Generally, a coating may be applied to a surface of a glass article, such as a container that may be used as a pharmaceutical package. The coating may provide advantageous properties to the coated glass article such as a reduced coefficient of friction and increased damage resistance. The reduced coefficient of friction may impart improved strength and durability to the glass article by mitigating frictive damage to the glass. Further, the coating may maintain the aforementioned improved strength and durability characteristics following exposure to elevated temperatures and other conditions, such as those experienced during packaging and pre-packaging steps utilized in packaging pharmaceuticals, such as, for example, depyrogenation, lyophilization, autoclaving and the like. Accordingly, the coatings and glass articles with the coating may be thermally stable.

Figure 1:
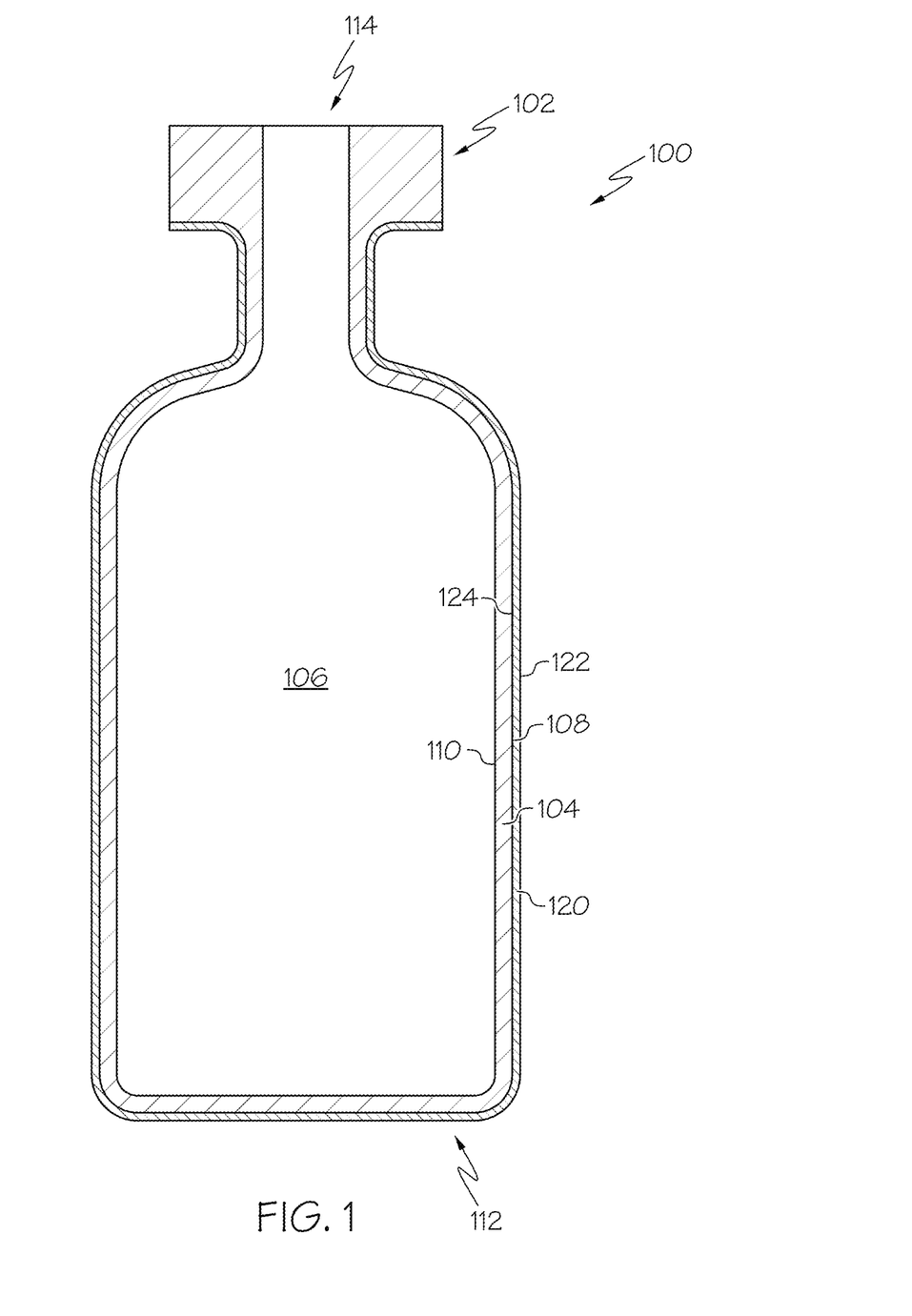
FIG. 1 schematically depicts a cross sectional view of a glass container with a coating, according to one or more embodiments shown and described herein.

FIG. 1 schematically depicts a cross section of a coated glass article, specifically a coated glass container 100. The coated glass container 100 comprises a glass body 102 and a coating 120. The glass body 102 has a glass container wall 104 extending between an exterior surface 108 (i.e., a first surface) and an interior surface 110 (i.e., a second surface). The interior surface 110 of the glass container wall 104 defines an interior volume 106 of the coated glass container 100. A coating 120 is positioned on at least a portion of the exterior surface 108 of the glass body 102. As used herein, a coating may be "positioned on" a substrate while not in direct contact with the substrate, such as if an intermediate layer is present between the substrate and a coating positioned over that substrate. In some embodiments, the coating 120 may be positioned on substantially the entire exterior surface 108 of the glass body 102. In some embodiments, such as depicted in FIG. 1, the coating 120 may be bonded to the glass body 102 at the exterior surface 108. The coating 120 has an outer surface 122 and a glass body contacting surface 124 at the interface of the glass body 102 and the coating 120.

In one embodiment, the coated glass container 100 is a pharmaceutical package. For example, the glass body 102 may be in the shape of a vial, ampoule, ampul, bottle, flask, phial, beaker, bucket, carafe, vat, syringe body, or the like. The coated glass container 100 may be used for containing any composition, and in one embodiment, may be used for containing a pharmaceutical composition. A pharmaceutical composition may include any chemical substance intended for use in the medical diagnosis, cure, treatment, or prevention of disease. Examples of pharmaceutical compositions include, but are not limited to, medicines, drugs, medications, medicaments, remedies, and the like. The pharmaceutical composition may be in the form of a liquid, solid, gel, suspension, powder, or the like.

Figure 2:
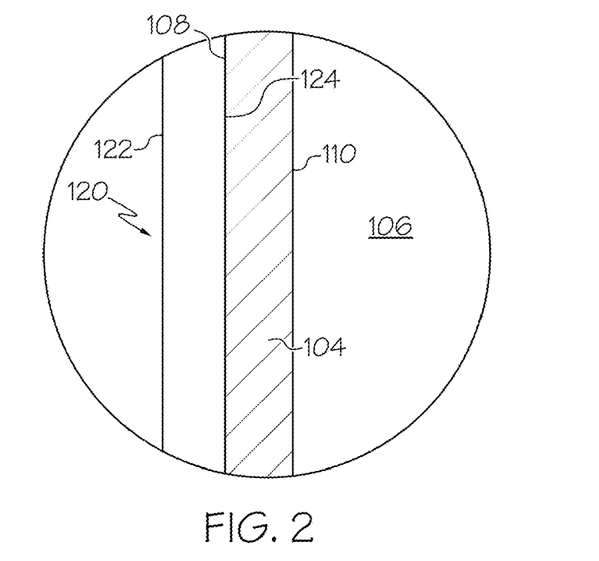
FIG. 2 schematically depicts an enlarged cross-sectional view of the glass container of FIG. 1 with a mono-layer coating, according to one or more embodiments shown and described herein.

Now referring to FIGS. 1 and 2, in one embodiment, the coating 120 may comprise a single-layered structure sometimes referred to herein as a "mono-layer" structure. For example, the coating 120 may have a substantially homogenous composition of one or more polymers mixed with one or more metal oxides. In other embodiments, the mixture may be mixed but not fully homogenous. For example, in one or more embodiments, one or more chemical constituents of the mixture may congregate at an interface of the coating 120 (e.g., the interface with the glass body 102 or the outer surface 122). In such an embodiment, the local concentration of a chemical constituent may differ over different areas of the coating 120. However, it should be understood that the term "mixed" as used herein refers to layers that have at least some dispersion of at least two chemical components, and includes layers that are not fully homogenous. Generally, a mixed layer is deposited as a mixture of two or more chemical constituents contained in a water-based coating mixture. It is contemplated that in some coatings described herein, two distinct layers may form even though the coating is applied in the single water-based coating mixture. For example, some coatings may form an inner layer in contact with the glass body 102 of metal oxide, and the polymer may be positioned in a layer over the inner layer.

As noted herein, the coating 120 may include a mixed composition which includes at least a metal oxide and a polymer. In general, the polymer may be a thermally stable polymer that will not degrade significantly or at all when exposed to temperatures suitable for depyrogenation, such as at least about 250° C., at least about 260° C., at least about 280° C., or even at least about 300° C. for about 30 minutes. In some embodiments, the metal oxide may include one or more of $TiO_2$ (titania), $ZrO_2$ (zirconia), $Al_2O_3$ (alumina), or combinations thereof.

The coating 120 may be applied to a glass body 102 in a water-based coating mixture comprising one or more metal oxide precursors, and one or more polymers or polymer precursors. The "water-based coating mixture" refers to the liquid mixture which contains the metal oxide precursor and polymer (or polymer precursor) which is applied to the glass body 102. As described herein, the water-based coating mixture comprises water in an amount of at least 50% by weight of the water-based coating mixture. In embodiments, the amount of water in the water-based coating mixture may be at least 60 wt. %, at least 70 wt. %, at least 80 wt. %, or even at least 90 wt. % based on the total weight of the water-based coating mixture. Generally, organic solvents are not present in the water-based coating mixture, or are present in relatively small amounts. For example, if the water-based coating mixture includes any organic solvents, they may be present in a weight ratio of organic solvent:water of less than 1:10, less than 1:25, less than 1:50, or even less than 1:100. Such coating mixtures may be advantageous because they are not affected by moisture in the air since water is already present in the coating mixture. Additionally, the minimal amount or absence of organic solvents allows for easier disposal and/or air quality maintenance. For example, hoods and or ventilation may not be needed or may be reduced. In one or more embodiments, the water-based coating may include less than 5 wt. %, less than 1 wt. %, or even less than 0.1 wt. % of one or more organic solvents such a methanol, ethanol, propyl alcohol, acetone, butanol, diethylene glycol, glycerin, ethylene glycol, dimethoxyethane, dimercaptosuccinic acid, or n-methyl-2-pyrrolidone. Such organic solvents may be desirably non-included, or included in small quantities in the coating mixture.

The water-based coating mixture generally includes at least water, along with the metal oxide precursor and polymer (or polymer precursor). As used herein, a "precursor" refers to a chemical constituent that contains material which will become a constituent in the coating 120 following application to and heating of the coated article 100. That is, at least some of the atoms of the precursor will become the atoms of the formed coating. For example, a metal oxide precursor may include the chemical components of the metal oxide (i.e., a metal and oxygen atoms) along with organic moieties that may evolve from the mixture during heating. Heating may cause the partial or complete hydrolysis of the metal oxide precursor, resulting in metal oxide. A polymer precursor may include non-polymerized chemical constituents that partially or fully polymerize or otherwise react upon curing under heat or another suitable curing environment. For example, a polyamic acid is considered a polymer precursor, as it imidizes to form a polyimide during curing by heat. Heating may also result in smaller chain polymers cross-linking or otherwise attaching with one another. As used herein, a "non-completely polymerized" precursor material may exist in a polymeric state, but may require further treatment to form particular polymeric bonding, such as imidization. It should be understood that in various embodiments, more than one metal oxide precursor may be included in the water-based coating mixture. Also, in various embodiments, more than one polymer, polymer precursor, or both, may be included in the water-based coating mixture. Furthermore, it should be understood that various metal oxide precursor materials may be present in the water-based coating mixture as oligomers or hydrolysates. It should be understood that for all metal oxide precursor materials disclosed herein, their oligomers and hydrolysate forms are contemplated as suitable metal oxide precursors.

In one or more embodiments, the metal oxide of the coating 120 may comprise titania, zirconium, alumina, or combinations thereof. However, other metal oxides are contemplated herein. Such metal oxides may promote adhesion between the glass and the polymer, and may additionally be relatively hard materials which prevent scratching or other defects from abrasion. For example, in some embodiments, polymers may readily peel from glass if a metal oxide precursor is not included in the water-based coating mixture. In one or more embodiments, the metal oxide of the coating 120 is derived from the metal oxide precursor in the water-based coating mixture. The metal oxide precursor may be an organometal, such as an organotitanium compound, an organozirconium compound, or an organoaluminum compound. The metal oxide precursors described herein are miscible or form emulsions with the water in the water-based coating mixture. As described herein, a substance that is miscible in water is a substance which dissolves or otherwise forms a fully homogenous mixture with the water of the water-based coating mixture. Additionally, as described herein, a substance that forms an emulsion with water is one which forms an emulsion with the water of the water-based coating mixture. It should be understood that a metal oxide precursor compound may not be miscible or form an emulsion in all concentrations in water. Rather, all that is needed is that it is miscible or forms an emulsion in a concentration with water that is present in the water-based coating mixture. For example, a material that is non-miscible with water at extremely high concentrations in water would none the less be considered as miscible in the water of the water-based coating mixture if it were miscible with water in its concentration present in the water-based coating mixture.

In one or more embodiments, the metal oxide precursor may be a titanium chelate. For example, the metal oxide precursor may be titanium chelate with lactic acid (ammonium salt) as the chelating agent, such as titanium(IV) bis(ammonium lactato)dihydroxide (commercially available for Dorf Ketal as TYZOR LA). According to additional embodiments, the metal oxide precursor may be titanium (IV) (triethanolaminato)isopropoxide (commercially available from Dorf Ketal as TYZOR TE). In an additional embodiment, the organic titanate $Ti(OCH(CH_3)_2)_4$ (commercially available as Tyzor 131 from Dorf Ketal), may be suitable for incorporation in the water-based coating mixture. In additional embodiments, the metal oxide may be zirconia formed from a zirconium-containing metal oxide precursor. In additional embodiments, the metal oxide may be alumina formed from an aluminum-containing metal oxide precursor. It should be appreciated that other metal oxide precursors which are miscible or form an emulsion in water are contemplated herein. Without being bound by any particular theory, it is believed that metal oxide precursors that include ligands containing higher numbers of oxygen atoms and/or nitrogen atoms and/or higher charges may be miscible or form emulsions in the water-based coating mixture. As such, embodiments of metal oxide precursors may include such oxygen atoms (such as two or more per molecule), nitrogen atoms (such as at least one per molecule), and/or high charge (such as 2+ or greater).

As described hereinabove, in one or more embodiments, the coating 120 also includes a polymer component in addition to the metal oxide. Such polymers are included in the water-based coating mixture, or are derived from polymer precursors in the water-based coating mixture. The polymer and/or polymer precursor of the water-based coating mixture may be miscible or form an emulsion in the water of the water-based coating mixture. In one or more embodiments, the polymer of the coating (e.g., the polymer derived from the polymer precursor following heating) may be any polymer or combination of polymers that do not substantially degrade at elevated temperatures such as at least about 250° C., at least about 260° C., at least about 280° C., or even at least about 300° C. As used herein, a polymer does not "substantially degrade" if it has not lost at least about 5% of its mass. For example, a TGA test can be utilized to determine whether a polymer substantially degrades at a given temperature. It should be understood that the polymers should not substantially degrade in heat treatments following the initial curing, and curing treatments do not constitute heat treatments utilized for verifying thermal stability of a coating or material of a coating, such as a polyimide. For example, polymers that may be included in the coating 120 may include polyimides, fluoropolymers, and/or polyamide imides.

In one or more embodiments, the water-based coating mixture comprises a fluoropolymer or precursor of a fluoropolymer. Without limitation, polytetrafluoroethylene is contemplated as a suitable polymer for inclusion in the water-based coating mixture. In additional embodiments, perfluoroalkoxy polymer (PFA), and tetrafluorethylene-perfluoropropylene (FEP) may be incorporated into the water-based coating mixture.

In additional embodiments, the polymer may be a polyimide which is present in the water-based coating mixture as a partially or fully imidized polyimide in the water. For example, some fluorinated emulsion-forming polyimides in water may be used which may be present in the water-based coating mixture in an imidized state.

In another embodiment, the polymer may be formed from a polymer precursor. For example, some polyimides may not be structurally stable in solution in polyimide form, and are instead present in solution or as an emulsion in water as polyamic acids, which may be non-cylized polyimide precursors which may be formed from, for example, diamine monomers and dianhydride monomers. Generally, polyamic acids must be cured to become imidized chemical species. Such curing may comprise heating the polyamic acid at 300° C. for about 30 minutes or less, or at a temperature higher than 300° C., such as at least 320° C., 340° C., 360° C., 380° C., or 400° C. It is contemplated that higher curing temperatures may be paired with shorter curing times. It is believed, without being bound by theory, that the curing step imidizes a polyamic acid by reaction of carboxylic acid moieties and amide moieties to form a polyimide.

Without limitation, other polymers such as polybenzimidazoles, polysulfones, polyetheretheketones, polyetherimides, polyamides, polyphenyls, polybenzothiazoles, polybenzoxazoles, polybisthiazoles, and polyaromatic heterocyclic polymers with and without organic or inorganic fillers, may be suitable for use in the water-based coating mixture. Precursors of these polymers, may alternatively be included in the water-based coating mixture.

In one or more embodiments, the weight ratio of metal oxide precursor to polymer or polymer precursor (or the combination thereof) in the water-based coating mixture may be from 50:1 to 1:1. For example, the ratio of metal oxide precursor to polymer or polymer precursor (or the combination thereof) may be from 20:1 to 5:1, from 15:1 to 10:1, or, for example, approximately 13:1. It should be understood that the amount of these materials is exclusive of any solvents that the materials may be present in prior to combination with the water to form the water-based coating mixture. The weight ratio of water to metal oxide precursor, polymer, and polymer precursor (solids) may be, in some embodiments, at least 5:1, at least 7.5:1, or even at least 10:1. For example, the water-based coating mixture may comprise at least 50 wt. % water, at least 60 wt. % water, at least 70 wt. % water, at least 80 wt. % water, at least 90 wt. % water, or even at least 95 wt. % water. It is believed that the solids weight percent in the water-based coating mixture may be changed to enable coatings having different thicknesses. For example, higher weight percent water-based coating mixtures may deposit thicker layers of coating 120. The water may additionally contribute to the coating system by help hydrolyze the metal oxide precursor to form metal oxide.

Referring again to FIGS. 1 and 2, the water-based coating mixture may be applied in a single deposition step. For example, the deposition may be by a submersion process, or alternatively, the water-based coating mixture may be applied by a spray or other suitable means, and optionally dried. A description of suitable deposition methods for the coatings 120 described herein may be found in U.S. patent application Ser. No. 13/780,740 entitled "Glass Articles with Low-Friction Coatings," which is incorporated by reference in its entirety herein. In additional embodiments, multiple depositions may be utilized. For example, multiple layers of water-based coating mixture depositions may be performed and then cured, or curing may follow each deposition step, such that a second coating of water-based coating mixture is applied onto a cured layer.

Following deposition of the water-based coating mixture, the water-based coating mixture may be dried, such as through heating. The heating may cause at least a portion of the water of the water-based coating mixture to be liberated, either by passive drying or by active drying step(s) such as controlled air flow or increased temperatures. The coated glass containers 100 may then be cured by exposure to heat. As described herein, "curing" refers to any process (usually by heating) which changes the material of the water-based coating mixture to an intermediate or final material. For example, some embodiments utilize a curing by heating which liberates constituents from the metal oxide precursor and forms the metal oxide. Curing, as described herein, need not involve cross-linking of polymers, or the polymerization of polymers. For example, a precursor composition that includes a polyimide and a metal oxide precursor may be cured under heat to liberate some mass from the metal oxide precursor to form the metal oxide. Such curing may comprise heating the coated vial at 300° C. for about 30 minutes or less, or at a temperature higher than 300° C., such as at least 320° C., 340° C., 360° C., 380° C., or 400° C. Curing conditions may depend on the type of precursor materials utilized. Without being bound by theory, it is believed that the curing step liberates water organic constituents of the metal oxide precursor, forming a metal oxide such as titania, alumina, or zirconia. Additionally, the curing step may partially or fully polymerize a polymer precursor, such as imidize a polyamic acid. Also, the curing step liberates any remaining solvents, such as water, of the water-based coating mixture.

The coating 120 applied to the glass body 102 may have a thickness of less than or equal to about 100 nm, less than or equal to about 10 nm, less than or equal to about 8 nm, less than or equal to about 6 µm, less than or equal to about 4 µm, less than or equal to about 3 µm, less than or equal to about 2 µm, or even less than or equal to about 1 µm. In some embodiments, the thickness of the coating 120 may be less than or equal to about 800 nm, less than or equal to about 600 nm, less than or equal to about 400 nm 300 nm, less than or equal to about 200 nm, or even less than or equal to about 100 nm thick. In other embodiments, the coating 120 may be less than about 90 nm thick, less than about 80 nm thick, less than about 70 nm thick, less than about 60 nm thick, less than about 50 nm, or even less than about 25 nm thick. In embodiments, the coating 120 may have a thickness of at least about 10 nm, at least about 15 nm, at least about 20 nm, at least about 25 nm, at least about 30 nm, at least about 35 nm, at least about 40 nm, or even at least about 45 nm. Exemplary embodiments may have a thickness of from about 20 nm to about 50 nm, from about 25 nm to about 45 nm, or from about 30 nm to about 40 nm. Without being bound by theory, it is believed that relatively thin coatings (i.e., less than 20 nm) may not adequately protect the glass, resulting in checking on the glass surface during vial-to-vial contact. In addition, such relatively thin coatings may not survive a depyrogenation process. On the other hand, relatively thick coatings (i.e., greater than 1 micron) may be more easily damaged and wear tracks in the coating may appear from vial-on-vial contacting. It should be noted that in the case of the relatively thick coatings, the wear tracks are believed to be deformations in the coating, and not in the glass. As described herein, wear tracks are visible tracks caused by abrasion on a coating, leaving a track or scuff. In some embodiments, wear tracks may signify glass checking and/or relatively high coefficient of friction (e.g., greater than 0.7).

In some embodiments, the coating 120 may not be of uniform thickness over the entirety of the glass body 102. For example, the coated glass container 100 may have a thicker coating 120 in some areas, due to the process of contacting the glass body 102 with one or more coating solutions that form the coating 120. In some embodiments, the coating 120 may have a non-uniform thickness. For example, the coating thickness may be varied over different regions of a coated glass container 100, which may promote protection in a selected region.

In some embodiments, a combination of polymers and metal oxides in the coating may comprise at least about 50 wt %, at least about 60 wt. %, at least about 70 wt. %, at least about 80 wt. %, at least about 90 wt. %, at least about 95 wt. %, at least about 96 wt. %, at least about 97 wt. %, at least about 98 wt. %, at least about 99 wt. %, at least about 99.5 wt. %, at least about 99.8 wt. %, or even at least about 99.9 wt. % of the coating. In some embodiments, where other constituents are not present, the combination coating 120 may consist of a combination of metal oxides and polymers.

The glass articles, such as glass containers (e.g., pharmaceutical packages), to which the coating 120 may be applied, may be formed from a variety of different glass compositions. The specific composition of the glass article may be selected according to the specific application such that the glass has a desired set of physical properties. According to one or more embodiments, the glass may be a composition which is known to exhibit chemical durability and low thermal expansion, such as alkali borosilicate glasses. According to another embodiment, may be formed from a Type I, Class B glass according to ASTM Standard E438-92.

The glass containers may be formed from a glass composition which has a coefficient of thermal expansion in the range from about $25 \times 10^{-7}/°$ C. to $80 \times 10^{-7}/°$ C. For example, in some embodiments described herein, the glass body 102 is formed from alkali aluminosilicate glass compositions which are amenable to strengthening by ion exchange. Such compositions generally include a combination of Sift, $Al_2O_3$, at least one alkaline earth oxide, and one or more alkali oxides, such as $Na_2O$ and/or $K_2O$. In some of these embodiments, the glass composition may be free from boron and compounds containing boron. In some other embodiments the glass compositions may further comprise minor amounts of one or more additional oxides such as, for example, $SnO_2$, $ZrO_2$, ZnO, $TiO_2$, $As_2O_3$, or the like. These components may be added as fining agents and/or to further enhance the chemical durability of the glass composition. In another embodiment, the glass surface may comprise a metal oxide coating comprising $SnO_2$, $ZrO_2$, ZnO, $TiO_2$, $As_2O_3$, or the like.

In some embodiments described herein, the glass body 102 is strengthened such as by ion-exchange strengthening, herein referred to as "ion-exchanged glass". For example, the glass body 102 may have a compressive stress of greater than or equal to about 300 MPa or even greater than or equal to about 350 MPa. In some embodiments, the compressive stress may be in a range from about 300 MPa to about 900 MPa. However, it should be understood that, in some embodiments, the compressive stress in the glass may be less than 300 MPa or greater than 900 MPa. In some embodiments, the glass body 102 may have a depth of layer greater than or equal to 20 µm. In some of these embodiments, the depth of layer may be greater than 50 µm or even greater than or equal to 75 µm. In still other embodiments, the depth of the layer may be up to or greater than 100 µm. The ion-exchange strengthening may be performed in a molten salt bath maintained at temperatures from about 350° C. to about 500° C. To achieve the desired compressive stress, the glass container (uncoated) may be immersed in the salt bath for less than about 30 hours or even less than about 20 hours. For example, in one embodiment the glass container is immersed in a 100% $KNO_3$ salt bath at 450° C. for about 8 hours.

In one embodiment, the glass body 102 may be formed from an ion exchangeable glass composition described in pending U.S. patent application Ser. No. 13/660,894 filed Oct. 25, 2012 and entitled "Glass Compositions with Improved Chemical and Mechanical Durability" assigned to Corning, Incorporated.

However, it should be understood that the coated glass containers 100 described herein may be formed from other glass compositions including, without limitation, ion-exchangeable glass compositions and non-ion exchangeable glass compositions. For example, in some embodiments the glass container may be formed from Type 1B glass compositions such as, for example, Schott Type 1B borosilicate glass.

In some embodiments described herein, the glass article may be formed from a glass composition which meets the criteria for pharmaceutical glasses described by regulatory agencies such as the USP (United States Pharmacopoeia), the EP (European Pharmacopeia), and the JP (Japanese Pharmacopeia) based on their hydrolytic resistance. Per USP 660 and EP 7, borosilicate glasses meet the Type I criteria and are routinely used for parenteral packaging. Examples of borosilicate glass include, but are not limited to, Corning® Pyrex® 7740, 7800 and Wheaton 180, 200, and 400, Schott Duran, Schott Fiolax, KIMAX® N-51A, Gerrescheimer GX-51 Flint and others. Soda-lime glass meets the Type III criteria and is acceptable in packaging of dry powders which are subsequently dissolved to make solutions or buffers. Type III glasses are also suitable for packaging liquid formulations that prove to be insensitive to alkali. Examples of Type III soda lime glass include Wheaton 800 and 900. De-alkalized soda-lime glasses have higher levels of sodium hydroxide and calcium oxide and meet the Type II criteria. These glasses are less resistant to leaching than Type I glasses but more resistant than Type III glasses. Type II glasses can be used for products that remain below a pH of 7 for their shelf life. Examples include ammonium sulfate treated soda lime glasses. These pharmaceutical glasses have varied chemical compositions and have a coefficient of linear thermal expansion (CTE) in the range of $20-85 \times 10^{-7}/°C$.

When the coated glass articles described herein are glass containers, the glass body 102 of the coated glass containers 100 may take on a variety of different forms. For example, the glass bodies described herein may be used to form coated glass containers 100 such as vials, ampoules, cartridges, syringe bodies and/or any other glass container for storing pharmaceutical compositions. Moreover, the ability to chemically strengthen the glass containers prior to coating can be utilized to further improve the mechanical durability of the glass containers. Accordingly, it should be understood that, in at least one embodiment, the glass containers may be ion exchange strengthened prior to application of the coating. Alternatively, other strengthening methods such as heat tempering, flame polishing, and laminating, as described in U.S. Pat. No. 7,201,965, could be used to strengthen the glass before coating.

Various properties of the coated glass containers (i.e., coefficient of friction, horizontal compression strength, 4-point bend strength) may be measured when the coated glass containers are in an as-coated condition (i.e., following application of the coating without any additional treatments other than curing if applicable) or following one or more processing treatments, such as those similar or identical to treatments performed on a pharmaceutical filling line, including, without limitation, washing, lyophilization, depyrogenation, autoclaving, or the like.

Depyrogenation is a process wherein pyrogens are removed from a substance. Depyrogenation of glass articles, such as pharmaceutical packages, can be performed by a thermal treatment applied to a sample in which the sample is heated to an elevated temperature for a period of time. For example, depyrogenation may include heating a glass container to a temperature of between about 250° C. and about 380° C. for a time period from about 30 seconds to about 72 hours, including, without limitation, 20 minutes, 30 minutes 40 minutes, 1 hour, 2 hours, 4 hours, 8 hours, 12 hours, 24 hours, 48 hours, and 72 hours. Following the thermal treatment, the glass container is cooled to room temperature. One conventional depyrogenation condition commonly employed in the pharmaceutical industry is thermal treatment at a temperature of about 250° C. for about 30 minutes. However, it is contemplated that the time of thermal treatment may be reduced if higher temperatures are utilized. The coated glass containers, as described herein, may be exposed to elevated temperatures for a period of time. The elevated temperatures and time periods of heating described herein may or may not be sufficient to depyrogenate a glass container. However, it should be understood that some of the temperatures and times of heating described herein are sufficient to depyrogenate a coated glass container, such as the coated glass containers described herein. For example, as described herein, the coated glass containers may be exposed to temperatures of about 250° C., about 260° C. about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. It is recognized that depyrogenation processes may have times other than 30 minutes, and 30 minutes is used throughout this disclosure with a depyrogenation temperature for comparative purposes such as, for example, coefficient of friction testing following exposure to a defined depyrogenation condition.

As used herein, lyophilization conditions (i.e., freeze drying) refer to a process in which a sample is filled with a liquid that contains protein and then frozen at low temperatures, such as -100° C., followed by water sublimation for a time such as 20 hours at a temperatures such as -15° C. under vacuum.

As used herein, autoclave conditions refer to steam purging a sample for a time period such as 10 minutes at 100° C., followed by a 20 minute dwelling period wherein the sample is exposed to a 121° C. environment, followed by 30 minutes of heat treatment at 121° C.

The coefficient of friction (p) of the portion of the coated glass container with the coating may have a lower coefficient of friction than a surface of an uncoated glass container formed from a same glass composition. A coefficient of friction (p) is a quantitative measurement of the friction between two surfaces and is a function of the mechanical and chemical properties of the first and second surfaces, including surface roughness, as well as environmental conditions such as, but not limited to, temperature and humidity. As used herein, a coefficient of friction measurement for coated glass container 100 is reported as the coefficient of friction between the outer surface of a first glass container (having an outer diameter of between about 16.00 mm and about 17.00 mm) and the outer surface of second glass container which is substantially identical to the first glass container, wherein the first and second glass containers have the same body and the same coating composition (when applied) and have been exposed to the same environments prior to fabrication, during fabrication, and after fabrication. Unless otherwise denoted herein, the coefficient of friction refers to the maximum coefficient of friction measured with a normal load of 30 N measured on a vial-on-vial testing jig, as described herein. However, it should be understood that a coated glass container which exhibits a maximum coefficient of friction at a specific applied load will also exhibit the same or better (i.e., lower) maximum coefficient of friction at a lesser load. For example, if a coated glass container exhibits a maximum coefficient of friction of 0.5 or lower under an applied load of 50 N, the coated glass container will also exhibit a maximum coefficient of friction of 0.5 or lower under an applied load of 25 N. To measure a maximum coefficient of friction, local maxima at or near the beginning of the test are excluded, as such maxima at or near the beginning of the test represent static coefficient of friction. As described in the embodiments herein, the coefficient of friction was measured where the speed of the containers relative to one another was about 0.67 mm/s.

Figure 3:
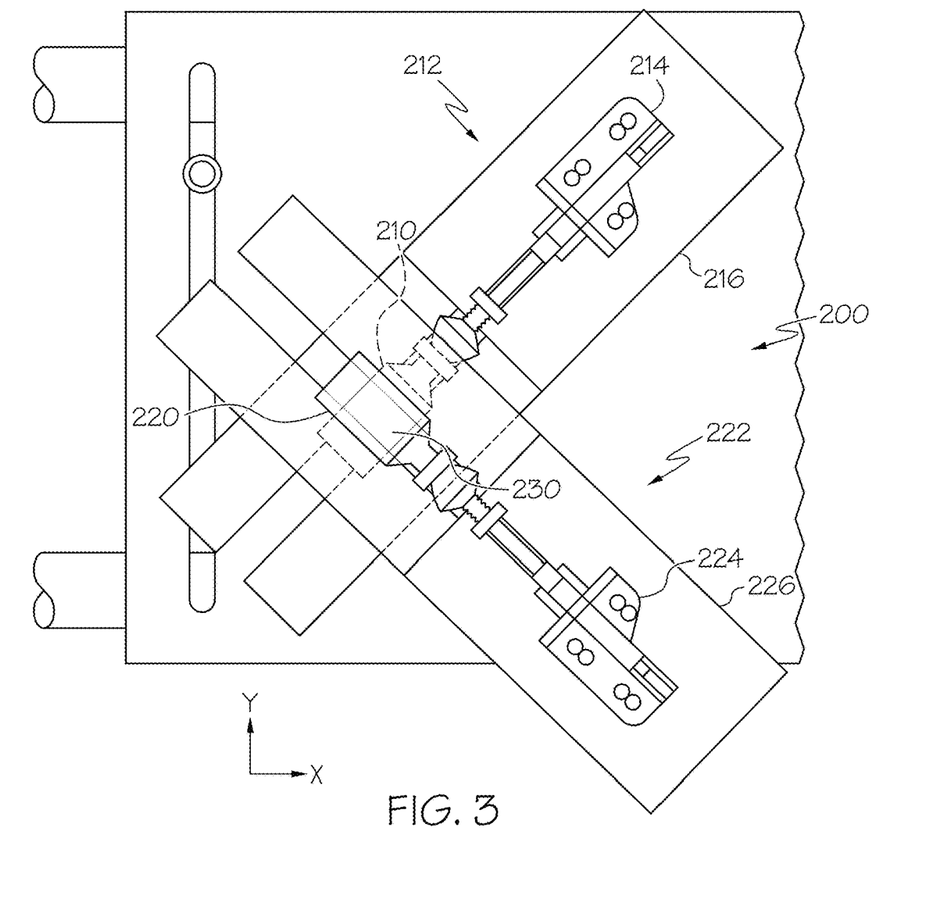
FIG. 3 schematically depicts a testing jig for determining the coefficient of friction between two surfaces, according to one or more embodiments shown and described herein.

In the embodiments described herein, the coefficient of friction of the glass containers (both coated and uncoated) is measured with a vial-on-vial testing jig. The testing jig 200 is schematically depicted in FIG. 3. The same apparatus may also be used to measure the frictive force between two glass containers positioned in the jig. The vial-on-vial testing jig 200 comprises a first clamp 212 and a second clamp 222 arranged in a cross configuration (i.e., perpendicular to one another). The first clamp 212 comprises a first securing arm 214 attached to a first base 216. The first securing arm 214 attaches to the first glass container 210 and holds the first glass container 210 stationary relative to the first clamp 212. Similarly, the second clamp 222 comprises a second securing arm 224 attached to a second base 226. The second securing arm 224 attaches to the second glass container 220 and holds it stationary relative to the second clamp 222. The first glass container 210 is positioned on the first clamp 212 and the second glass container 220 is positioned of the second clamp 222 such that the long axis of the first glass container 210 and the long axis of the second glass container 220 are positioned at about a 90° angle relative to one another and on a horizontal plane defined by the x-y axis.

A first glass container 210 is positioned in contact with the second glass container 220 at a contact point 230. A normal force is applied in a direction orthogonal to the horizontal plane defined by the x-y axis. The normal force may be applied by a static weight or other force applied to the second clamp 222 upon a stationary first clamp 212. For example, a weight may be positioned on the second base 226 and the first base 216 may be placed on a stable surface, thus inducing a measurable force between the first glass container 210 and the second glass container 220 at the contact point 230. Alternatively, the force may be applied with a mechanical apparatus, such as a UMT (universal mechanical tester) machine.

The first clamp 212 or second clamp 222 may be moved relative to the other in a direction which is at a 45° angle with the long axis of the first glass container 210 and the second glass container 220. For example, the first clamp 212 may be held stationary and the second clamp 222 may be moved such that the second glass container 220 moves across the first glass container 210 in the direction of the x-axis. A similar setup is described by R. L. De Rosa et al., in "Scratch Resistant Polyimide Coatings for Alumino Silicate Glass surfaces" in The Journal of Adhesion, 78: 113-127, 2002. To measure the coefficient of friction, the force required to move the second clamp 222 and the normal force applied to first and second glass containers 210, 220 are measured with load cells and the coefficient of friction is calculated as the quotient of the frictive force and the normal force. The jig is operated in an environment of 25° C. and 50% relative humidity.

In one or more embodiments described herein, the portion of the coated glass container with the coating has a coefficient of friction of less than or equal to about 0.7 relative to a like-coated glass container, as determined with the vial-on-vial jig described above. In other embodiments, the coefficient of friction may be less than or equal to about 0.6, or even less than or equal to about 0.5. In some embodiments, the portion of the coated glass container with the coating has a coefficient of friction of less than or equal to about 0.4 or even less than or equal to about 0.3. Coated glass containers with coefficients of friction less than or equal to about 0.7 generally exhibit improved resistance to frictive damage and, as a result, have improved mechanical properties. For example, conventional glass containers (without a coating) may have a coefficient of friction of greater than 0.7.

In some embodiments described herein, the coefficient of friction of the portion of the coated glass container with the coating is at least 20% less than a coefficient of friction of a surface of an uncoated glass container formed from a same glass composition. For example, the coefficient of friction of the portion of the coated glass container with the coating may be at least 20% less, at least 25% less, at least 30% less, at least 40% less, or even at least 50% less than a coefficient of friction of a surface of an uncoated glass container formed from a same glass composition.

In some embodiments, the portion of the coated glass container with the coating may have a coefficient of friction of less than or equal to about 0.7 after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In other embodiments, the portion of the coated glass container with the coating may have a coefficient of friction of less than or equal to about 0.7, (i.e., less than or equal to about 0.6, less than or equal to about 0.5, less than or equal to about 0.4, or even less than or equal to about 0.3) after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the coefficient of friction of the portion of the coated glass container with the coating may not increase by more than about 30% after exposure to a temperature of about 250° C. (or about 260° C.) for 30 minutes. In other embodiments, coefficient of friction of the portion of the coated glass container with the coating may not increase by more than about 30% (i.e., about 25%, about 20%, about 15%, or even about 10%) after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In other embodiments, coefficient of friction of the portion of the coated glass container with the coating may not increase by more than about 0.5 (i.e., about 0.45, about 0.4, about 0.35, about 0.3, about 0.25, about 0.2, about 0.15, about 0.1, or even about 0.05) after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the coefficient of friction of the portion of the coated glass container with the coating may not increase at all after exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes.

In some embodiments, the portion of the coated glass container with the coating may have a coefficient of friction of less than or equal to about 0.7 after being submerged in a water bath at a temperature of about 70° C. for 10 minutes. In other embodiments, the portion of the coated glass container with the coating may have a coefficient of friction of less than or equal to about 0.7, (i.e., less than or equal to about 0.6, less than or equal to about 0.5, less than or equal to about 0.4, or even less than or equal to about 0.3) after being submerged in a water bath at a temperature of about 70° C. for 5 minutes, 10 minutes, 20 minutes, 30 minutes, 40 minutes, 50 minutes, or even 1 hour. In some embodiments, the coefficient of friction of the portion of the coated glass container with the coating may not increase by more than about 30% after being submerged in a water bath at a temperature of about 70° C. for 10 minutes. In other embodiments, coefficient of friction of the portion of the coated glass container with the coating may not increase by more than about 30% (i.e., about 25%, about 20%, about 15%, or event about 10%) after being submerged in a water bath at a temperature of about 70° C. for 5 minutes, 10 minutes, 20 minutes, 30 minutes, 40 minutes, 50 minutes, or even 1 hour. In some embodiments, the coefficient of friction of the portion of the coated glass container with the coating may not increase at all after being submerged in a water bath at a temperature of about 70° C. for 5 minutes, 10 minutes, 20 minutes, 30 minutes, 40 minutes, 50 minutes, or even 1 hour.

In some embodiments, the portion of the coated glass container with the coating may have a coefficient of friction of less than or equal to about 0.7 after exposure to lyophilization conditions. In other embodiments, the portion of the coated glass container with the coating may have a coefficient of friction of less than or equal to about 0.7, (i.e., less than or equal to about 0.6, less than or equal to about 0.5, less than or equal to about 0.4, or even less than or equal to about 0.3) after exposure to lyophilization conditions. In some embodiments, the coefficient of friction of the portion of the coated glass container with the coating may not increase by more than about 30% after exposure to lyophilization conditions. In other embodiments, coefficient of friction of the portion of the coated glass container with the coating may not increase by more than about 30% (i.e., about 25%, about 20%, about 15%, or event about 10%) after exposure to lyophilization conditions. In some embodiments, the coefficient of friction of the portion of the coated glass container with the coating may not increase at all after exposure to lyophilization conditions.

In some embodiments, the portion of the coated glass container with the coating may have a coefficient of friction of less than or equal to about 0.7 after exposure to autoclave conditions. In other embodiments, the portion of the coated glass container with the coating may have a coefficient of friction of less than or equal to about 0.7, (i.e., less than or equal to about 0.6, less than or equal to about 0.5, less than or equal to about 0.4, or even less than or equal to about 0.3) after exposure to autoclave conditions. In some embodiments, the coefficient of friction of the portion of the coated glass container with the coating may not increase by more than about 30% after exposure to autoclave conditions. In other embodiments, coefficient of friction of the portion of the coated glass container with the coating may not increase by more than about 30% (i.e., about 25%, about 20%, about 15%, or event about 10%) after exposure to autoclave conditions. In some embodiments, the coefficient of friction of the portion of the coated glass container with the coating may not increase at all after exposure to autoclave conditions.

The coated glass containers described herein have a horizontal compression strength. The horizontal compression strength, as described herein, is measured by positioning the coated glass container 100 horizontally between two parallel platens which are oriented in parallel to the long axis of the glass container. A mechanical load is then applied to the coated glass container 100 with the platens in the direction perpendicular to the long axis of the glass container. Prior to being placed in the platens, the glass containers are wrapped in 2 inch tape, and the overhang is cut off or folded around the bottom of the container. The tape is provided to contain pieces of glass if the vial breaks, and does not affect results determined by the test. The container is then positioned within an index card that is stapled around the specimen. The load rate for vial compression is 0.5 in/min, meaning that the platens move towards each other at a rate of 0.5 in/min. The horizontal compression strength is measured at 25° C.±2° C. and 50%±5% relative humidity. It is desirable, in some embodiments, to perform the horizontal compression test within 1 hour (and not more than 24 hours) following depyrogenation to simulate pharmaceutical filling line conditions. The horizontal compression strength is a measurement of load at failure, and measurement of the horizontal compression strength can be given as a failure probability at a selected normal compression load. As used herein, failure occurs when the glass container ruptures under a horizontal compression in least 50% of samples. Thus, the horizontal compression is provided for a group of samples. In some embodiments, a coated glass container may have a horizontal compression strength at least 10%, 20%, or 30% greater than an uncoated vial.

Referring now to FIGS. 1 and 3, the horizontal compression strength measurement may also be performed on an abraded glass container. Specifically, operation of the testing jig 200 may create damage on the coated glass container outer surface 122, such as a surface scratch or abrasion that weakens the strength of the coated glass container 100. The glass container is then subjected to the horizontal compression procedure described above, wherein the container is placed between two platens with the scratch pointing outward parallel to the platens. The scratch can be characterized by the selected normal pressure applied by a vial-on-vial jig and the scratch length. Unless identified otherwise, scratches for abraded glass containers for the horizontal compression procedure are characterized by a scratch length of 20 mm created by a normal load of 30 N. It may be desired to have the scratch at a 90° angle relative to the platens, ±5°.

The coated glass containers can be evaluated for horizontal compression strength following a heat treatment. The heat treatment may be exposure to a temperature of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes. In some embodiments, the horizontal compression strength of the coated glass container is not reduced by more than about 20%, 30%, or even 40% after being exposed to a heat treatment, such as those described above, and then being abraded, as described above. In one embodiment, the horizontal compression strength of the coated glass container is not reduced by more than about 20% after being exposed to a heat treatment of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes, and then being abraded.

The coated glass articles described herein may be thermally stable after exposure to thermal treatments such as depyrogenation, lyophilization, and/or autoclaving, such that after exposure to the thermal treatment the mechanical properties of the coated glass article are only minimally affected, if at all. For example, such exposure to thermal treatments may include heating to a temperature of at least 250° C. (or 260° C., or 280° C., or 300° C.) for a time period of 30 minutes. The phrase "thermally stable," as used herein, means that the coating applied to the glass article remains substantially intact on the surface of the glass article after exposure to the thermal treatment (such as at elevated temperatures) such that, after exposure, the mechanical properties of the coated glass article, specifically the coefficient of friction and the horizontal compression strength, are only minimally affected, if at all. This indicates that the coating remains adhered to the surface of the glass following elevated temperature exposure and continues to protect the glass article from mechanical insults such as abrasions, impacts and the like.

In the embodiments described herein, a coated glass article is considered to be thermally stable if the coated glass article meets both a coefficient of friction standard and a horizontal compression strength standard after heating to the specified temperature and remaining at that temperature for the specified time. To determine if the coefficient of friction standard is met, the coefficient of friction of a first coated glass article is determined in as-received condition (i.e., prior to any thermal exposure) using the testing jig depicted in FIG. 3 and a 30 N applied load. A second coated glass article (i.e., a glass article having the same glass composition and the same coating composition as the first coated glass article) is thermally exposed under the prescribed conditions and cooled to room temperature. Thereafter, the coefficient of friction of the second glass article is determined using the testing jig depicted in FIG. 3 to abrade the coated glass article with a 30 N applied load resulting in an abrasion (i.e., a "scratch") having a length of approximately 20 mm. If the coefficient of friction of the second coated glass article is less than 0.7 and the surface of the glass of the second glass article in the abraded area does not have any observable damage, then the coefficient of friction standard is met for purposes of determining the thermal stability of the coating. The term "observable damage," as used herein means that the surface of the glass in the abraded area of the glass article contains less than six glass checks per 0.5 cm of length of the abraded area when observed with a Nomarski or differential interference contrast (DIC) spectroscopy microscope at a magnification of 100× with LED or halogen light sources. A standard definition of a glass check or glass checking is described in G. D. Quinn, "NIST Recommended Practice Guide: Fractography of Ceramics and Glasses," NIST special publication 960-17 (2006).

To determine if the horizontal compression strength standard is met, a first coated glass article is abraded in the testing jig depicted in FIG. 3 under a 30 N load to form a 20 mm scratch. The first coated glass article is then subjected to a horizontal compression test, as described herein, and the retained strength of the first coated glass article is determined. A second coated glass article (i.e., a glass article having the same glass composition and the same coating composition as the first coated glass article) is thermally exposed under the prescribed conditions and cooled to room temperature. Thereafter, the second coated glass article is abraded in the testing jig depicted in FIG. 3 under a 30 N load. The second coated glass article is then subjected to a horizontal compression test, as described herein, and the retained strength of the second coated glass article is determined. If the retained strength of the second coated glass article does not decrease by more than about 20% relative to the first coated glass article (i.e., the load to failure does not decrease by more than 20%) then the horizontal compression strength standard is met for purposes of determining the thermal stability of the coating.

The coated glass containers described herein have a four point bend strength. To measure the four point bend strength of a glass container, a glass tube that is the precursor to the coated glass container 100 is utilized for the measurement. The glass tube has a diameter that is the same as the glass container but does not include a glass container base or a glass container mouth (i.e., prior to forming the tube into a glass container). The glass tube is then subjected to a four point bend stress test to induce mechanical failure. The test is performed at 50% relative humidity with outer contact members spaced apart by 9" and inner contact members spaced apart by 3" at a loading rate of 10 mm/min.

The four point bend stress measurement may also be performed on a coated and abraded tube. Operation of the testing jig 200 may create an abrasion on the tube surface such as a surface scratch that weakens the strength of the tube, as described in the measurement of the horizontal compression strength of an abraded vial. The glass tube is then subjected to a four point bend stress test to induce mechanical failure. The test is performed at 25° C. and at 50% relative humidity using outer probes spaced apart by 9" and inner contact members spaced apart by 3" at a loading rate of 10 mm/min, while the tube is positioned such that the scratch is put under tension during the test.

In some embodiments, the four point bend strength of a glass tube with a coating after abrasion shows on average at least 10%, 20%, or even 50% higher mechanical strength than that for an uncoated glass tube abraded under the same conditions.

In some embodiments, after the coated glass container 100 is abraded by an identical glass container with a 30 N normal force, the coefficient of friction of the abraded area of the coated glass container 100 does not increase by more than about 20% following another abrasion by an identical glass container with a 30 N normal force at the same spot, or does not increase at all. In other embodiments, after the coated glass container 100 is abraded by an identical glass container with a 30 N normal force, the coefficient of friction of the abraded area of the coated glass container 100 does not increase by more than about 15% or even 10% following another abrasion by an identical glass container with a 30 N normal force at the same spot, or does not increase at all. However, it is not necessary that all embodiments of the coated glass container 100 display such properties.

The transparency and color of the coated container may be assessed by measuring the light transmission of the container within a range of wavelengths between 400-700 nm using a spectrophotometer. The measurements are performed such that a light beam is directed normal to the container wall such that the beam passes through the coating twice, first when entering the container and then when exiting it. In some embodiments, the light transmission through the coated glass container may be greater than or equal to about 50% of a light transmission through an uncoated glass container (passing through two walls of the container) for wavelengths from about 400 nm to about 700 nm. As described herein, a light transmission can be measured before a thermal treatment or after a thermal treatment, such as the heat treatments described herein. For example, for each wavelength of from about 400 nm to about 700 nm, the light transmission may be greater than or equal to about 50% of a light transmission through an uncoated glass container. In other embodiments, the light transmission through the coated glass container is greater than or equal to about 55%, about 60%, about 65%, about 70%, about 75%, about 80%, or even about 90% of a light transmission through an uncoated glass container for wavelengths from about 400 nm to about 700 nm.

As described herein, a light transmission can be measured before an environmental treatment, such as a thermal treatment described herein, or after an environmental treatment. For example, following a heat treatment of about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., or about 400° C., for a period of time of 30 minutes, or after exposure to lyophilization conditions, or after exposure to autoclave conditions, the light transmission through the coated glass container is greater than or equal to about 55%, about 60%, about 65%, about 70%, about 75%, about 80%, or even about 90% of a light transmission through an uncoated glass container for wavelengths from about 400 nm to about 700 nm.

In some embodiments, the coated glass container 100 may be perceived as colorless and transparent to the naked human eye when viewed at any angle. In some other embodiments, the coating 120 may have a perceptible tint, such as when the coating 120 comprises a polymer which is colored.

In some embodiments, the coated glass container 100 may have a coating 120 that is capable of receiving an adhesive label. That is, the coated glass container 100 may receive an adhesive label on the coated surface such that the adhesive label is securely attached. However, the ability of attachment of an adhesive label is not a requirement for all embodiments of the coated glass containers 100 described herein.

EXAMPLES

Various embodiments of methods for making glass articles with coatings will be further clarified by the following examples. The examples are illustrative in nature, and should not be understood to limit the subject matter of the present disclosure.

Example 1

A coating mixture was prepared by mixing 23 mL of water with 2 mL of Tyzor TE (80 wt. % organotitanate in alcohol solvent), and then combining that mixture with 0.2 mL PTFE emulsion solution (60 wt. % dispersion in $H_2O$, Sigma 665800). The solution formed was well mixed by shaking. The coating mixture was applied to glass vials by a process that included placing bare glass vials at 360° C. for 15 minutes, cooling the vials to room temperature, dip coating the vials with the coating mixture at a speed of 200 mm/min. The vials with the applied coating mixture were then heated at 75° C. for 30 minutes, and then at 420° C. for 30 minutes. Following heating, the coated vials were cooled to room temperature.

Example 2

The coated vials of Example 1 were tested for coefficient of friction (COF) by the testing procedures as is described herein. Six samples (Samples 1-6) were tested with no additional heating, 6 additional samples (Samples 7-12) were tested following heating at 335° C. for 6 hours (following the curing at 420° C. for 30 minutes), and 6 additional samples (Samples 13-18) were tested following heating at 335° C. for 16 hours (following the curing at 420° C. for 30 minutes). The results of this coefficient of friction testing is presented in Table 1. The COF is relatively low even in samples that are exposed to heat treatments following coated vial fabrication.

TABLE 1

| Coated Vial Sample | Average COF | Maximum COF |
| --- | --- | --- |
| 1 | 0.082 | 0.105 |
| 2 | 0.09 | 0.144 |
| 3 | 0.096 | 0.121 |
| 4 | 0.092 | 0.102 |
| 5 | 0.083 | 0.089 |
| 6 | 0.089 | 0.117 |
| Average of Samples 1-6 | 0.089 | 0.113 |
| 7 | 0.141 | 0.203 |
| 8 | 0.189 | 0.274 |
| 9 | 0.233 | 0.44 |
| 10 | 0.144 | 0.266 |
| 11 | 0.113 | 0.181 |
| 12 | 0.192 | 0.322 |
| Average of Samples 7-12 | 0.168 | 0.281 |
| 13 | 0.125 | 0.185 |
| 14 | 0.115 | 0.162 |
| 15 | 0.095 | 0.132 |
| 16 | 0.109 | 0.126 |
| 17 | 0.112 | 0.136 |
| 18 | 0.101 | 0.124 |
| Average of Samples 13-18 | 0.109 | 0.144 |

Example 3

Figure 4:
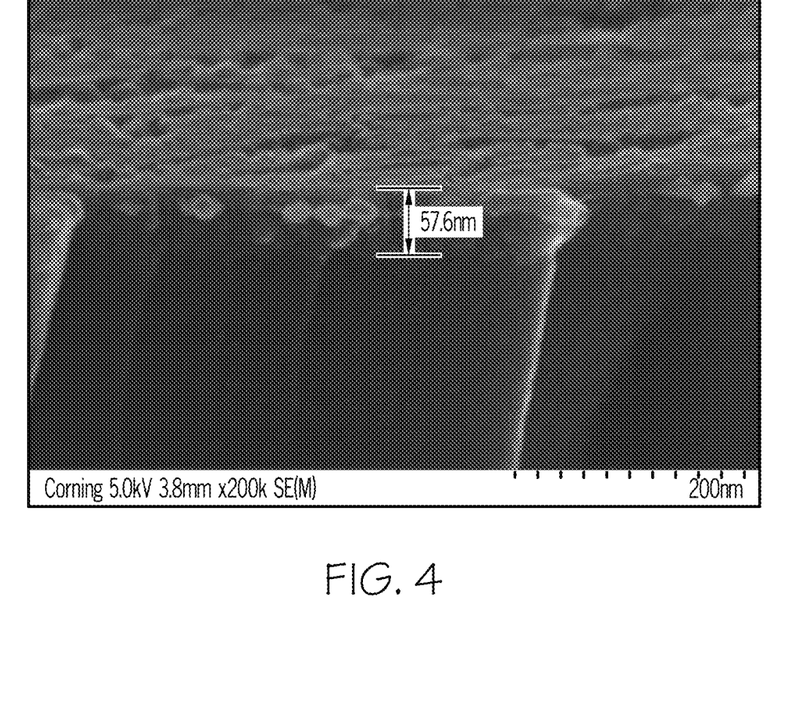
FIG. 4 depicts a scanning electron micrograph of a cross-section of a coated glass container, according to one or more embodiments shown and described herein.

The coated vials of Example 1 were observed by scanning electron microscopy. A cross sectional view was shown by cleaving (e.g., cracking) the vial. The coating had a thickness of about 57.6 nm. The SEM is shown as FIG. 4

Example 4

Figure 5:
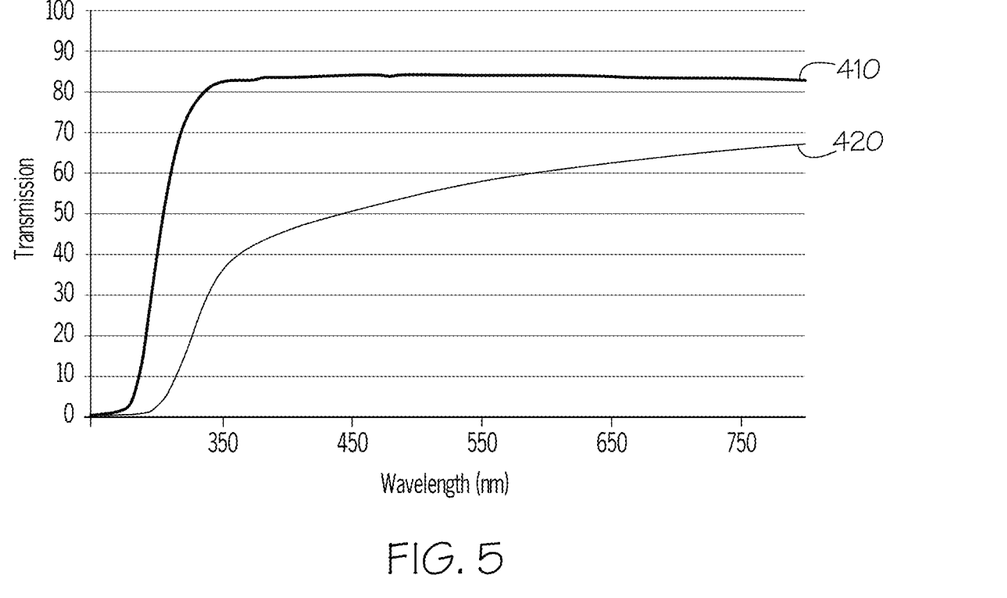
FIG. 5 depicts light transmission data for coated and uncoated vials, according to one or more embodiments described herein.

Light transmission was measured through the coated vials of Example 1. The transmission of light through the coated vial is shown as line 420 of FIG. 5, while the transmission of a vial without the coating is shown as line 410 of FIG. 5.

It should now be understood that glass containers with coatings that may have desirable thermal properties and/or relatively low coefficient of friction may be made by methods that utilize water-based coating mixtures rather than conventional coating mixtures which utilize organic solvents. These coatings make the glass containers well suited for use in various applications including, without limitation, pharmaceutical packaging, while not utilizing large quantities of organic solvents which may be less environmentally than the present water-based coating mixtures.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method for making a coated glass article, the method comprising:
    applying a water-based coating mixture onto at least a portion of a first surface of a glass article, wherein the water-based coating mixture comprises:
        water in an amount of at least 60% by weight of the water-based coating mixture;
        a polymer or polymer precursor, wherein the polymer or polymer precursor is miscible in the water or forms an emulsion with the water; and
        a metal oxide precursor that is miscible in the water or forms an emulsion with the water; and
    heating the water-based coating mixture to form a coating on the first surface of the glass article, the coating comprising metal oxide and polymer,
    wherein the coated glass article is a glass container.

2. The method of claim 1, wherein the polymer of the water-based coating mixture comprises a fluoropolymer.

3. The method of claim 1, wherein the metal oxide precursor comprises an organotitanate.

4. The method of claim 1, wherein the metal oxide precursor comprises an organometallic chelate.

5. The method of claim 1, wherein the metal oxide of the coating comprises titania.

6. The method of claim 1, wherein the weight ratio of organic solvent to water, if organic solvent is present, is less than about 1:10.

7. The method of claim 1, wherein the polymer of the coating does not substantially degrade at temperatures of at least about 250° C.

8. The method of claim 1, wherein the coating has a coefficient of friction of less than or equal to about 0.7.

9. The method of claim 1, wherein the polymer of the water-based coating mixture comprises polyimide, polyimide amide, or polyamic acid.

10. The method of claim 1, wherein the water-based coating mixture comprises water in an amount of at least 80% by weight of the water-based coating mixture.

11. A method for making a coated pharmaceutical package, the method comprising:
    applying a water-based coating mixture onto at least a portion of a first surface of a glass container, wherein the water-based coating mixture comprises:
        water in an amount of at least 60% by weight of the water-based coating mixture;
        a polymer or polymer precursor, wherein the polymer or polymer precursor is miscible in the water or forms an emulsion with the water; and
        a metal oxide precursor that is miscible in the water or forms an emulsion with the water; and
    heating the water-based coating mixture to form a coating on the first surface of the glass container, the coating comprising metal oxide and polymer.

12. The method of claim 11, wherein the polymer of the water-based coating mixture comprises a fluoropolymer.

13. The method of claim 11, wherein the metal oxide precursor comprises an organotitanate.

14. The method of claim 11, wherein the metal oxide precursor comprises an organometallic chelate.

15. The method of claim 11, wherein the metal oxide of the metal oxide of the coating comprises titania.

16. The method of claim 11, wherein the weight ratio of organic solvent to water, if organic solvent is present, is less than about 1:10.

17. The method of claim 11, wherein the polymer of the coating does not substantially degrade at temperatures of at least about 250° C.

18. The method of claim 11, wherein the coating has a coefficient of friction of less than or equal to about 0.7.

19. The method of claim 11, wherein the polymer of the water-based coating mixture comprises polyimide, polyimide amide, or polyamic acid.

20. The method of claim 11, wherein the water-based coating mixture comprises water in an amount of at least 80% by weight of the water-based coating mixture.

* * * * *

UNITED STATES PATENT AND TRADEMARK OFFICE
CERTIFICATE OF CORRECTION

Page 1 of 1

PATENT NO. : 11,091,389 B2
APPLICATION NO. : 16/540382
DATED : August 17, 2021
INVENTOR(S) : Weijun Niu et al.

It is certified that error appears in the above-identified patent and that said Letters Patent is hereby corrected as shown below:

On the Title Page

On page 2, in Column 2, item (56), Other Publications, Line 18, delete "Syperhydrophobic" and insert -- Superhydrophobic --, therefor.

In the Claims

In Column 22, Line 29 (approx.), Claim 15, before "coating comprises" delete "metal oxide of the".

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*